United States Patent
Mikesic (12) 
(10) Patent No.: US 6,329,933 B1
(45) Date of Patent: Dec. 11, 2001

(54) PORTABLE EMERGENCY LANDING AREA LIGHTING DEVICE FOR HELICOPTERS

(76) Inventor: Stephen J. Mikesic, 891 Wagner St., Nanty Glo, PA (US) 15943

( * ) Notice: Subject to any disclaimer, the term of this patent is extended or adjusted under 35 U.S.C. 154(b) by 0 days.

(21) Appl. No.: 09/759,490

(22) Filed: Jan. 16, 2001

Related U.S. Application Data (63) Continuation-in-part of application No. 09/414,070, filed on Oct. 7, 1999.

(51) Int. Cl.[7] ............................................. G08B 21/00
(52) U.S. Cl. ...................... 340/946; 362/156; 362/187
(58) Field of Search ............................ 340/946, 321, 340/473, 478, 908.1; 362/156, 191, 187, 205

(56) References Cited

U.S. PATENT DOCUMENTS

| | | |
|---|---|---|
| 3,539,986 | 11/1970 | Crawford . |
| 4,827,245 | 5/1989 | Lipman . |
| 5,109,322 | 4/1992 | Loughlin . |
| 5,121,308 | 6/1992 | Maglica et al. . |
| 5,521,595 | 5/1996 | Totten et al. . |
| 5,559,510 | 9/1996 | Strong, III et al. . |
| 5,627,513 | 5/1997 | Weed et al. . |
| 5,685,421 | 11/1997 | Gilmore . |
| 5,785,410 | 7/1998 | Branson, Sr. . |
| 5,836,672 | 11/1998 | Maglica et al. . |

FOREIGN PATENT DOCUMENTS

| | | |
|---|---|---|
| 1062677 | 7/1976 | (CA) . |
| 1256639 | 12/1971 | (GB) . |
| 1437111 | 5/1976 | (GB) . |

*Primary Examiner*—John Tweel
(74) *Attorney, Agent, or Firm*—Richard C. Litman (57) ABSTRACT

A portable emergency lighting device for helicopters which transmits visible and radio signals which indicate the position of an emergency rescue area. The device has a housing with a beacon disposed on its top wall. The device also includes a battery source disposed in the housing that is rechargeable via a special adapter by an emergency vehicle using a standard 12 volt DC system. The device is easily carried to a remote location where vehicles may be unable to reach. Several lighting devices can be configured to define a landing area near the location of a patient for easy access and rescue. The device may be mounted and transported within a variety of different emergency rescue vehicles.

6 Claims, 7 Drawing Sheets

PORTABLE EMERGENCY LANDING AREA LIGHTING DEVICE FOR HELICOPTERS

CROSS-REFERENCE TO RELATED APPLICATION

This application is a continuation-in-part of the U.S. patent application Ser. No. 09/414,070 filed Oct. 7, 1999.

BACKGROUND OF THE INVENTION

1. Field of the Invention

The present invention relates to air field indicators. More specifically, the invention is a portable lighting device useful for assisting an aircraft in locating an emergency landing site.

2. Description of the Related Art

It is common to use helicopters for evacuation of injured persons from the site of a major catastrophe (e.g., vehicle accident, fire, train derailment, skiing accident, etc.). In addition, helicopters are widely used in many other types of search, rescue and retrieval operations, such as locating persons lost in the wild and transporting those persons when they have been located by a rescue party. However, the most common element in any situation involving a helicopter during evacuation or rescue is the difficulty of landing in unknown areas. Landing sites must be established for the landing and take-off of helicopters, and their location must be clearly marked. This allows for the safety of the helicopter, the helicopter crew, and most of all the safety of the person or persons being rescued. Thus there is a need for establishing and clearly marking a landing site. The present application addresses this need.

Many attempts have been made to provide a helicopter with an adequate source of landing site indication. For example, U.S. Pat. No. 3,539,986, issued Nov. 10, 1970 to Crawford, discloses a portable landing zone having a frame made of pipes, and a plurality of lights and flags on the frame. While the Crawford system is portable, it requires a inordinate amount of time to set up the landing zone. Such time may be the difference in survival of an individual.

Other examples of prior art are U.S. Pat. No. 4,827,245, issued May 2, 1989 to Lipman, which discloses a portable, multi-element strobe lighting system for providing portable highway control. U.S. Pat. No. 5,109,322, issued Apr. 28, 1992 to Loughlin, discloses a firefighters' safety beacon. U.S. Pat. No. 5,521,595, issued May 28, 1996 to Totten, et al., and U.S. Pat. No. 5,559,510, issued Sep. 24, 1996 to Strong III, et al., each disclose an illumination device having a vertically standing lighting member and a base member, for hazard warning or navigational illumination. U.S. Pat. No. 5,685,421 issued to Gilmore discloses similar vertical light standing features wherein the light is fixed to a tool box for vertical manipulation.

U.S. Patents issued to Maglica et al. (U.S. Pat. Nos. 5,121,308 and 5,836,672) discloses a miniature rechargeable flashlight which utilizes a dual switch mechanism for activating and deactivating the flashlight, respectively. A miniature two or three cell flashlight comprises a barrel, a tailcap, a head assembly and a lamp or bulb support. An interruptible electrical coupling formed by the switch mechanisms connects to the dry cell batteries with recharging capabilities made via conductors mounted in the tailcap.

Additionally, U.S. Pat. No. 5,627,513, issued May 6, 1997 to Weed, et al., discloses a portable visual emergency signal device having a triangularly shaped multi-element strobe lighting device with a detachable base. U.S. Pat. No. 5,785,410, issued Jul. 28, 1998 to Branson, Sr., discloses an electronic road beacon for alerting on-coming traffic to a potentially hazardous roadway condition. The device is designed for resisting impact by road vehicles. Canadian Patent Document No. 1,062,677, published Sep. 18, 1979, shows a telescoping illumination type device. Great Britain Patent Document No. 1,256,639, published Dec. 8, 1971, shows an emergency light having a semicircular base form maintaining the light above the ground. Great Britain Patent Document No. 1,437,111, published May 26, 1976, shows an illuminated waterway navigational aid.

None of the above inventions and patents, taken either singularly or in combination, is seen to describe the instant invention as claimed. Thus a portable emergency landing area lighting device for helicopters solving the aforementioned problems is desired.

SUMMARY OF THE INVENTION

In most common rescue or retrieval operations, the head lights or roof mounted emergency lights of at least four or five vehicles are used to define a landing zone for an emergency helicopter. Instead of four or five emergency vehicles being called to light a landing area with headlights, the present invention provides a strobe light that will give a better landing area designation both at night and day.

Accordingly, it is a principal object of the invention to provide a portable high intensity beacon strobe light for emergency rescue and retrieval operations.

It is another object of the invention to provide a device having a rechargeable power supply.

It is a further object of the invention to provide an emergency beacon device having highly reflective areas about the surface thereof.

It is further still an object of the invention to provide a emergency radio signal to an emergency rescue aircraft rescue area identification.

Still another object of the invention is to provide a portable device which is impact and water resistant.

Further still another object of the invention is to provide a portable device which is capable of withstanding rotor wash.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is directed to an emergency signalling device for emergency rescue aircraft in remote areas. The preferred embodiments are depicted in FIGS. 1–6, and are each generally referenced by numeral 7. Elemental differences in the lighting device 7 are separately identified by numerical designation as to the addition of and/or deletion of an interior component element, respectively.

Figure 1:
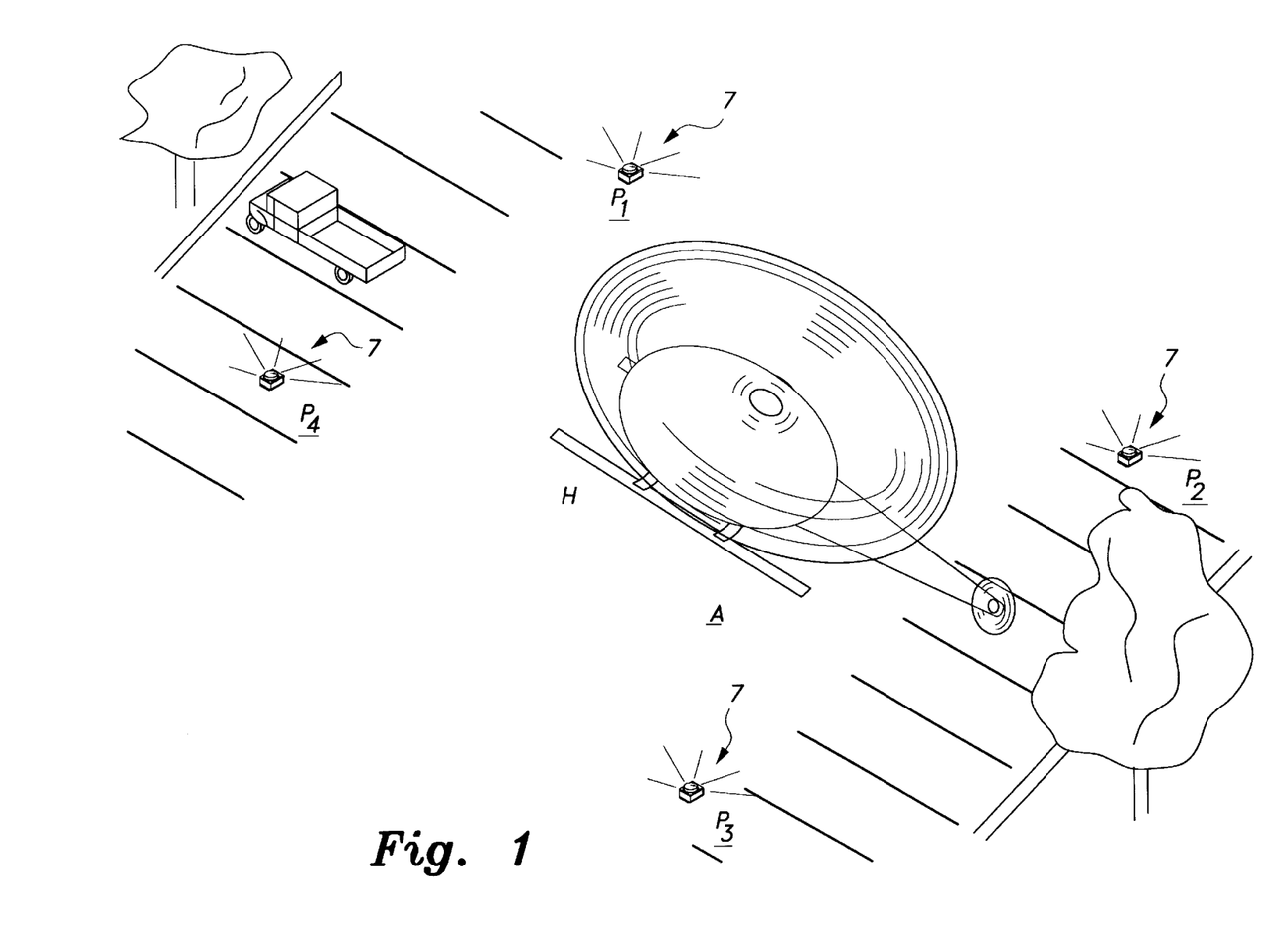
FIG. 1 is an environmental perspective view of a portable emergency lighting device for landing aircraft according to the present invention.

As diagrammatically illustrated in FIG. 1, the portable lighting device 7 is shown in plurality for establishing at least a four point ($P_1$, $P_2$, $P_3$ and $P_4$) signalling area or rescue area A for helicopter or emergency aircraft touchdown and lift-off during emergency rescues. This particular configuration provides a sufficient landing and lift-off area A with adequate signal or light visibility.

Figure 2:
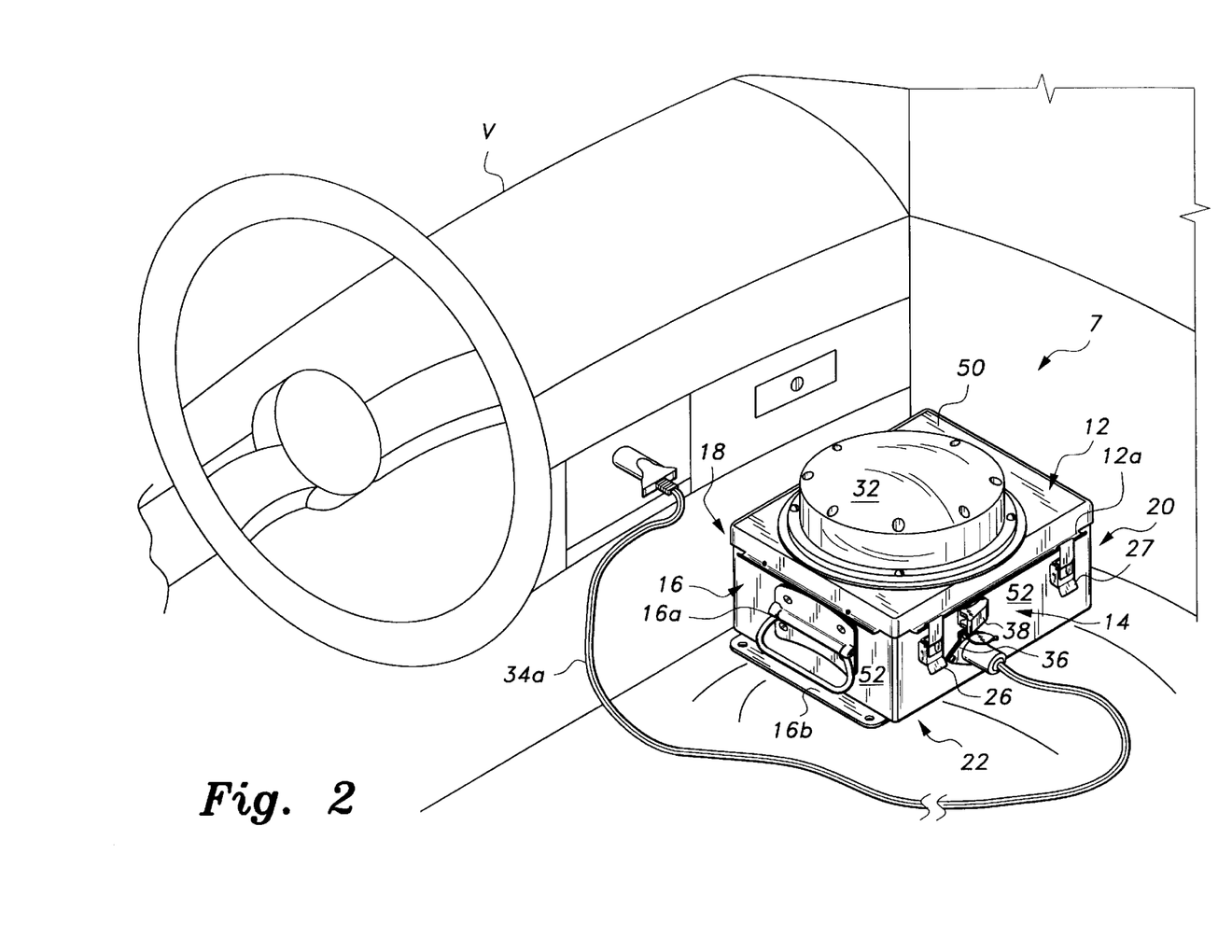
FIG. 2 is a perspective view of the portable emergency lighting device according to the invention, illustrating rechargeable adaptive features.

As diagrammatically illustrated in FIG. 2, the portable signalling device 7 is shown adapted for recharging while housed in a rescue or other vehicle V. The device 7 is rectangular in shape and forms a waterproof and impact resistant housing. The housing has a bottom wall 22, a top wall 12, and four side walls 14, 16 having a first water proof handle assembly 16a, 18 and 20 having a second water proof handle assembly opposing the handle 16a for two-handed support or user transport. The top wall 12, bottom wall 22, and four side walls (namely first wall 14, second wall 16, third wall 18, and fourth wall 20) define an interior compartment 30 for housing at least one signalling circuit board 40, a rechargeable power source or battery 34, associated wiring and a rechargeable adapter 34a.

The dimensions of the device 7 are such that the length is within a range from 8.5 to 9.5 inches, preferably 9.0 inches, the width is in the range from 8.0 to 9.0 inches, preferably 8.5, and the height is within the range from 6.0 inches to 7.0 inches, well within F.A.A. regulations for the maximum height of Final Approach and Take Off (F.A.T.O.) area lights. Each of the walls is formed of 0.12 inch steel plate, and all of the seams between the plates are welded or shaped and formed as a unitary impact resistant structure.

The exterior surfaces of each wall are primed and painted with high intensity coloration. The preferred coloration is fluorescent red-orange, which is highly visible in all atmospheric conditions.

In addition, the top wall 12 and all of the side walls 14, 16, 18, 20 have reflective areas 50, 52, respectively thereon. Reflective areas 50 are red and reflective areas 52 are red-orange or white.

The reflective areas 50, 52 are provided either as reflective paint or reflective tape. These reflective areas 50, 52 meet all current federal specifications and regulations. In addition, the beacon cover 32 is also color regulated and can include a red, yellow, blue, etc. as a color code specific transmission light or beacon.

The top wall 12 also includes at least one extension wall or ledge 12a which extends from an end of the top wall and substantially along its length for insertably receiving at least one clamp fastener.

The first side wall 14 is disposed so as to form a door security wall for securing the top wall 12 supported by a hinge 24 and pin 24a assembly disposed on one end of top 12 and another end of wall 18 thereof via a set of first and second latches 26,27.

The door or top wall 12 provides access to the interior compartment 30 of the housing. Latches 26,27 provide positive, sure closure for the interior compartment 30, as well as allowing easy access therein via attachment with or removal from the ledge 12a. In addition, the side wall surface 14 also includes an ON/OFF power switch 38. The power switch 38 preferably is an aircraft safety switch. The purpose for this type of switch 38 is to require the user to make a definitive maneuver to turn the device 7 on, preventing an inadvertent powering of the beacon 32, and more importantly, reducing premature discharge of the battery 34.

Further, an electrical coupler 36 is placed on the side wall surface 14 adjacent to the power switch 38. The electrical coupler 36 provides a selective linking port for recharging the battery 34. The electrical coupler 36 is of any conventional cannon plug and connector type. Conventional adapters and cords provide easy links for a vehicle to recharge the battery 34 via electrical coupler 36. Also, it is within the purview of the invention to provide a regulator allowing for simultaneous recharging of the battery 34 and using the device 7. It is noted that the electrical coupler 36 may be any other type of electrical couple connector.

On the second side wall 16 adjacent to the latch end of the door 14 is a handle 16a for convenience of carrying and manipulating the housing and having the sturdiness to remain latched, preventing unwanted openings. The handle 16a is a conventional flush mounted, expandable handle 16a. The handle 16a is attached to the exterior surface of the side wall at each of its ends. The handle 16a lies flush against the exterior surface between the attached ends. When a user grasps the handle 16a, it expands or rotates so as to separate from the exterior surface, allowing the hand of the user to fit comfortably and securely therearound while carrying the device 7 and while manipulating the position of the device 7. The handle assembly 16a is any conventional pivot buckle type latching device, but includes in addition waterproof seals 17. This is the preferred type of handle and latch assembly 16a for ease in transporting the door device 7. At least one support flange 16b is also mounted on an end of the respective exterior wall surfaces 16 and 2 for hanging via apertures 9 or slidably mounting the device 7 in a rescue or other vehicle as a tongue in groove attachment during transport. (Refer to FIG. 6)

Figure 3A:
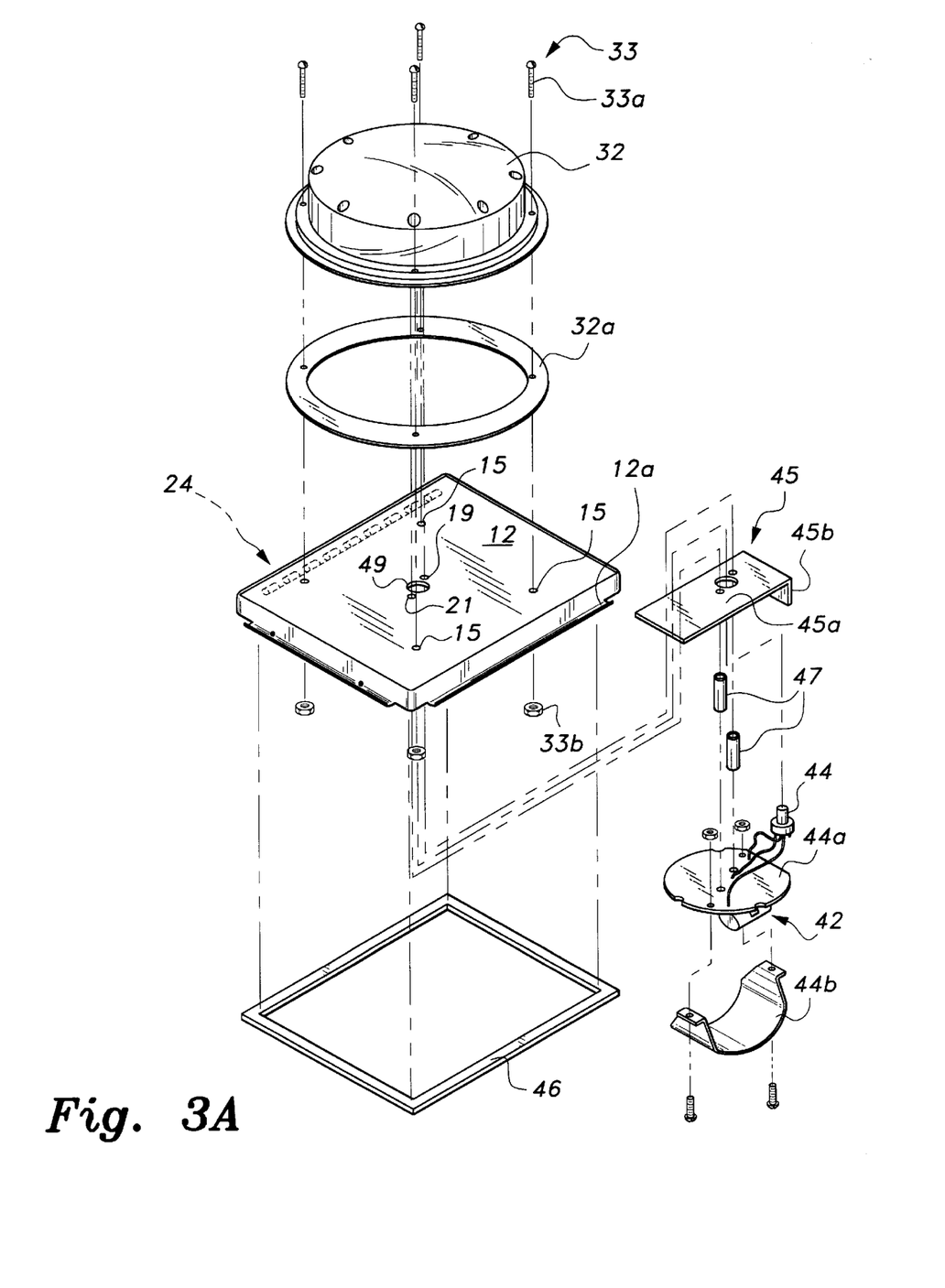
FIG. 3A is an exploded perspective view of a top portion of the portable emergency lighting device according to the invention.

As diagrammatically illustrated in FIG. 3A, an exploded view of the top wall 12 of the housing is shown to illustrate the waterproof attachment of the illumination source cover or safety beacon lens 32 and assembly. The assembly includes a lens seal 32a which is disposed between the lens 32 the top surface 12 via apertures 15 (at four distinct locations) via mechanical nut 33b and bolt 33a fasteners 33. Located within a central portion of the top wall 12 is an aperture 49 insertably receiving the strobe light portion 44 therein. Apertures 19 and 21 are also disposed in peripheral relation with the central aperture 49 for securing a combination support bracket or plate 45. The support bracket 45 supports both the strobe light 44 and circuit board 44a including nonconductive cover 44b at one end 45a and matingly abuts with a side portion of the battery 34 so that the battery is securely mounted within the interior without moving. Mounted within the underside of the top wall surface 12 is a substantially rectangular impact seal 46 which provides a impact cushion between the surrounding walls (14, 16, 18 and 20) when the top 12 is securely fastened by latches. The aforementioned surrounding walls including the bottom wall 22 constitutes the base 7a of the device 7. As recited above, the illumination source 44 is generally a strobe type light for flashing. Insulative or nonconductive support elements 47 are provided to prevent short circuits and the like. Since assembly of the various circuits is considered to be well within the knowledge of one having ordinary skill in the out such connections are not discussed in detail. Accordingly, the flashing strobe light provides a helicopter pilot a reference point via the color coded illumination source cover 32, or preferably arranged at points (i.e. $P_1$, $P_{22}$, $P_3$ and $P_4$) when a multiplicity of devices 7 are used, for safely landing in a site where rescue and retrieval is warranted. The beacon 44 may be mounted flush with the top wall 12, or may be raised above the surface of the top wall 12. It is critical to note that current F.A.A. regulations require that the total height of the device 7 be no greater than 8.0 inches. Therefore, the preferred height of the device 7 is 6.5 inches, allowing the beacon to extend no more than 1.5 inches above the top wall 12 surface. The beacon 44 is powered by a rechargeable battery 34 disposed in the interior compartment 30 of the housing. The beacon is preferably equipped with a red lens, although the lens 32 may also be either white, yellow or blue.

Figure 3B:
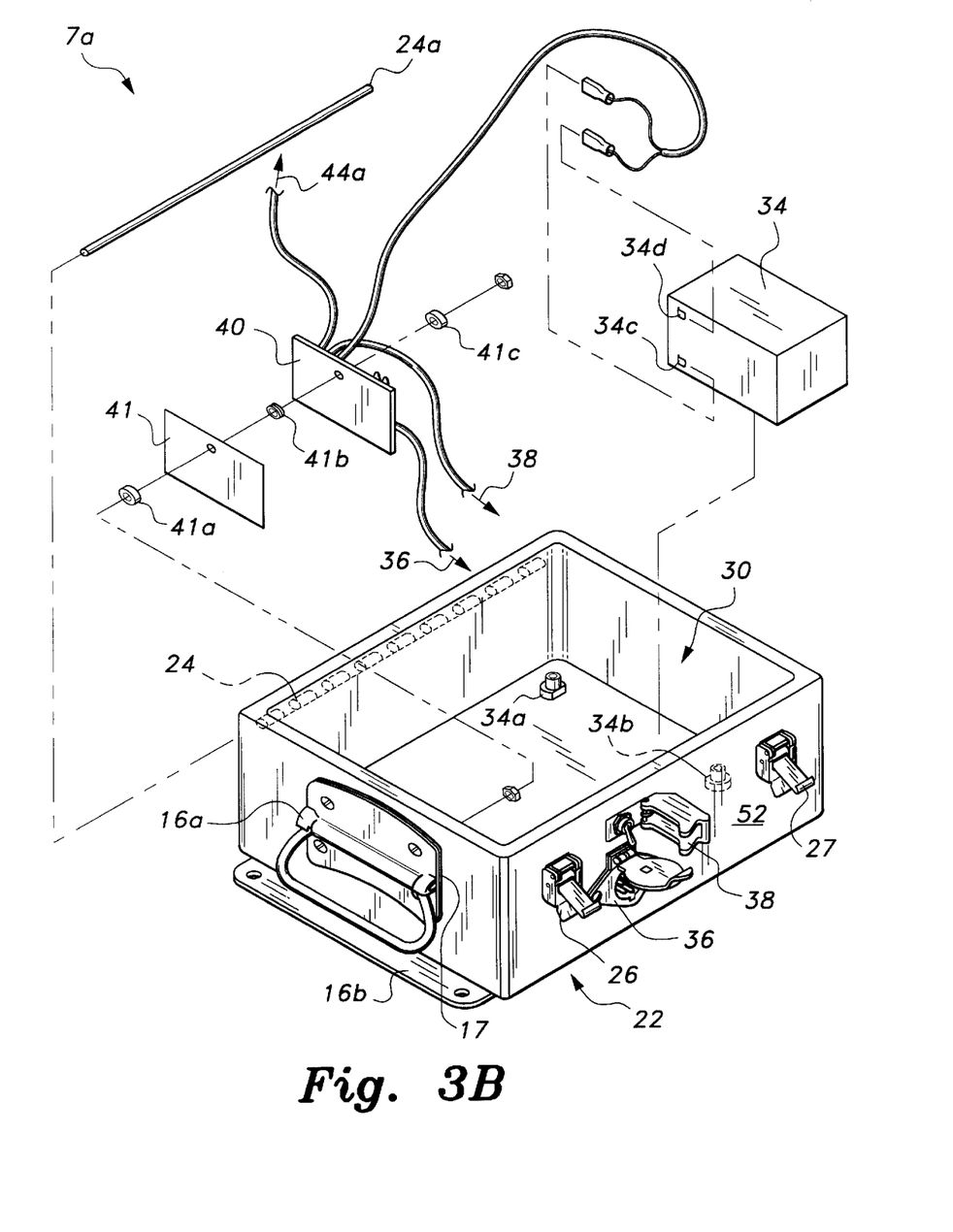
FIG. 3B is an exploded perspective view of the base portion of the portable emergency lighting device, illustrating an interior light circuit and power source connection according to a first embodiment.
Figure 4:
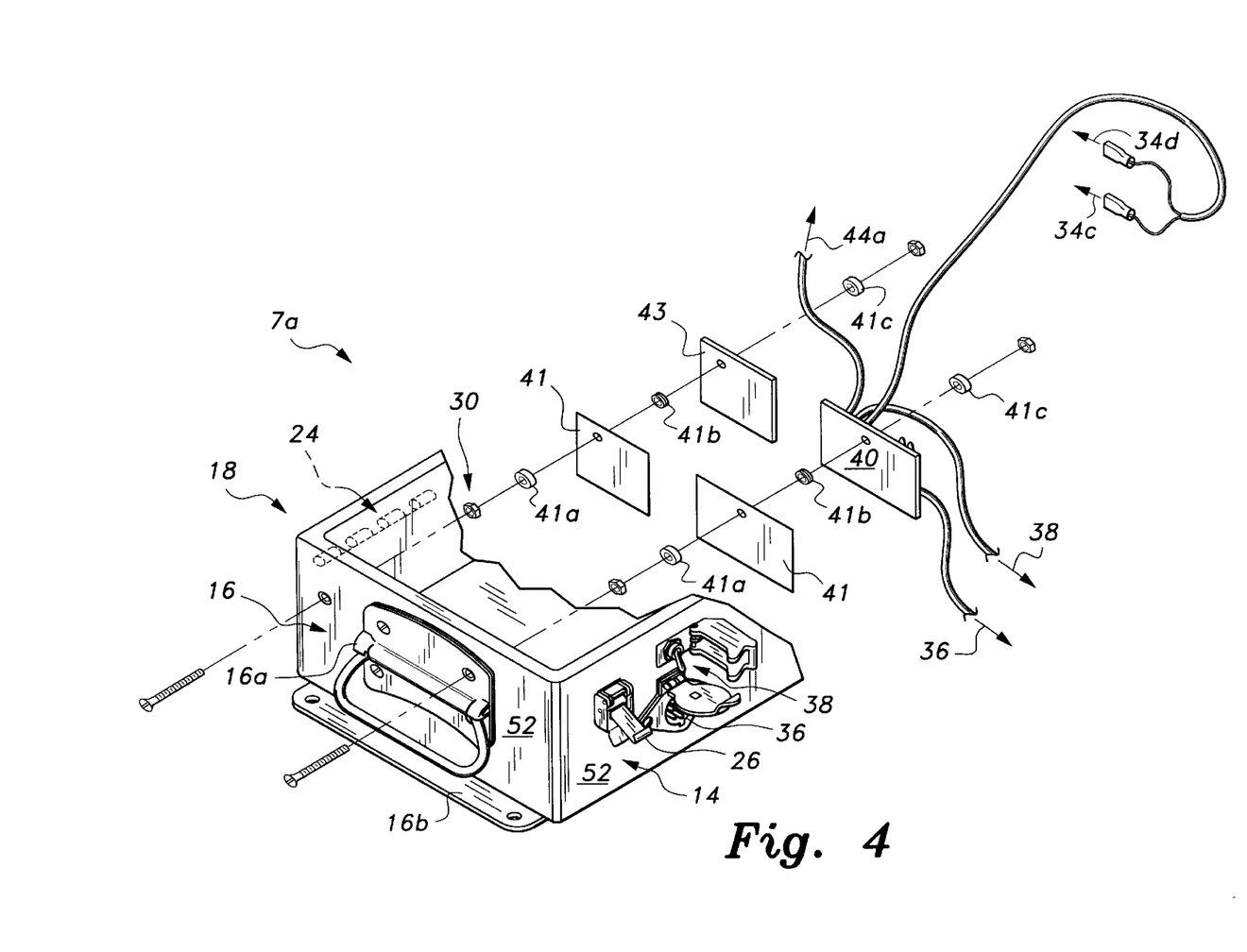
FIG. 4 is an exploded partial perspective view of the base portion of the portable emergency lighting device, illustrating an interior light and radio transmitter circuit connection according to a second embodiment.

As diagrammatically illustrated in FIGS. 3B and 4, the interior compartment 30 of the device 7 has the battery 34 via set of first and second studs 34a and 34b mounted within an interior portion surface portion of the base 22. The interior compartment 30 also includes a circuit 40 with a nonconductive support card 41 mounted and secured thereto via a mechanical fastener with inter-disposed non-conductive washer elements 41a, 41b and 41c, respectively. The light driving circuit 40 electrically couples the battery 34 via positive and negative poles 34c and 34d to the power switch 38, the electrical coupler 36, and the beacon 44 via strobe light circuit 44a. As shown in FIG. 3, the circuit 40 includes control module 42 that produces a timed power pulse for causing the strobe element 44 to flash. Such circuitry is well known in the electrical arts and will not be described further. The device 7 weighs about nineteen pounds. In addition, the interior compartment 30 has volume space for inserting ballast material, such as metal plates, in order to increase the weight of the device 7. The ballast material may be needed for stabilization of the device 7, preventing rotor-wash by a helicopter. It is preferred that a Hoffman box be used for this purpose. FIG. 4 also illustrates the addition of a second circuit 43 mounted within the interior 30 of the device 7 in a similar way as noted for the light circuit 40. Circuit 43 is preferably a radio transmitter or transceiver circuit 43 for sending signals to an a helicopter pilot or the like particularly when there is virtually zero visibility. This particular circuit feature 43 is also readily available, and would require only routine skill in the art to configure.

Figure 5:
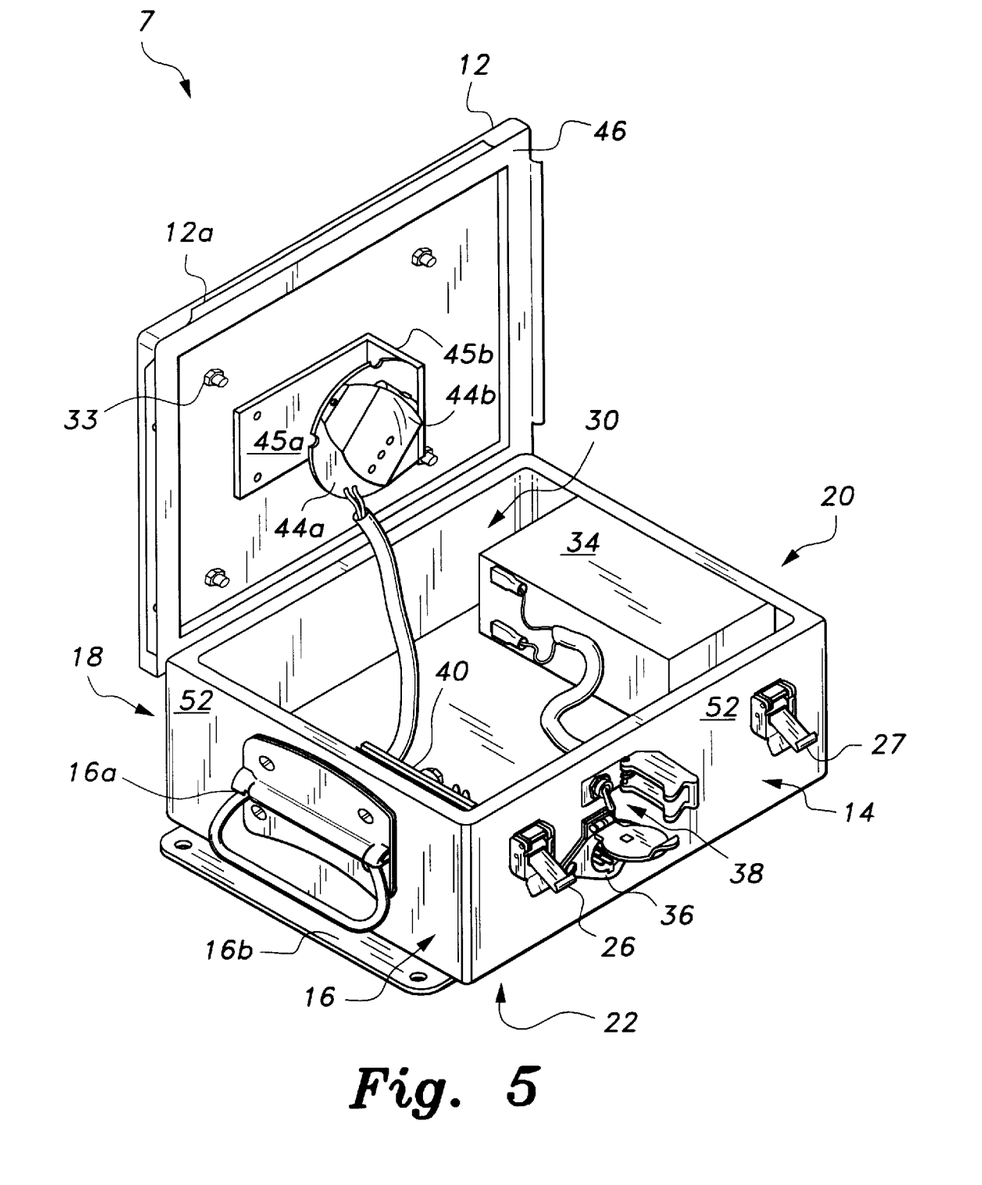
FIG. 5 is a perspective view of the portable emergency lighting device according to the first embodiment, illustrating in part light and battery circuit connections.
Figure 6:
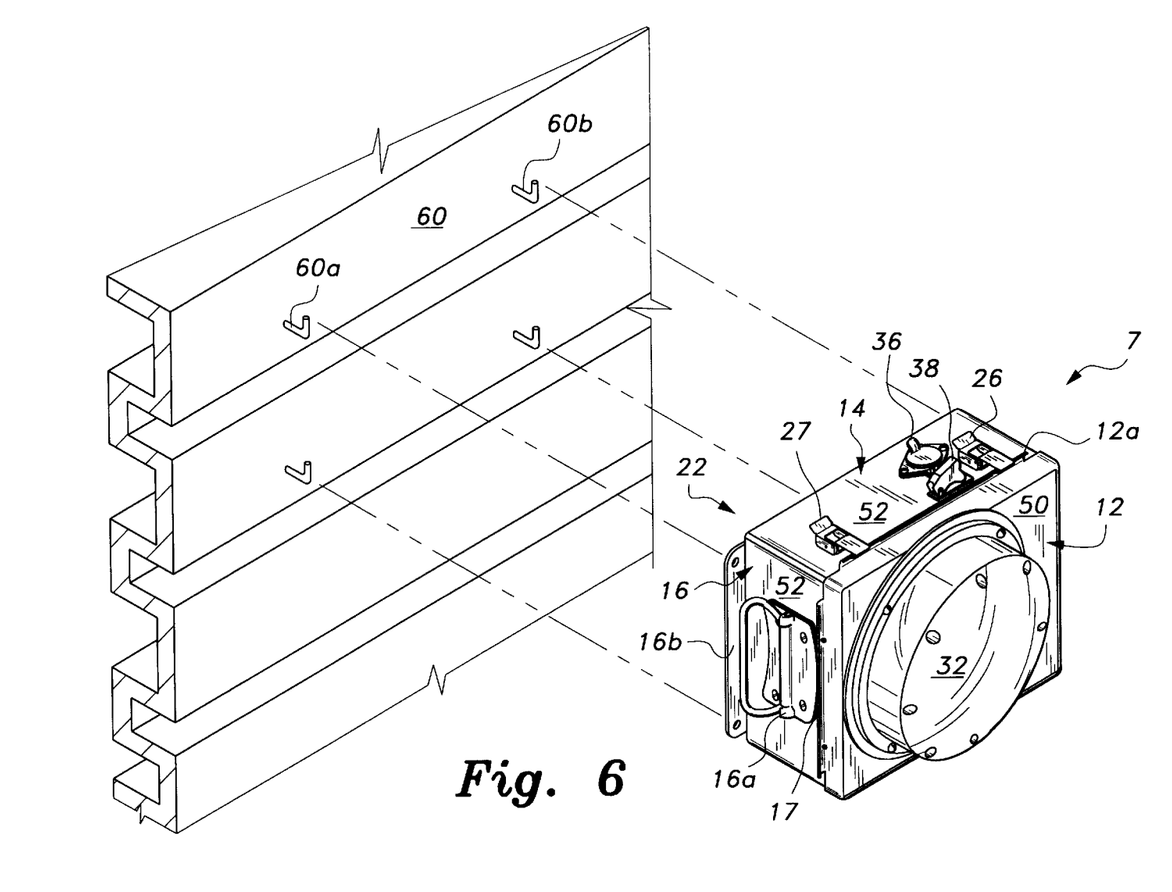
FIG. 6 is an exploded perspective view of the emergency lighting device, illustrating lines of attachment for wall mounting the device to a vehicle.

In full assembly, FIG. 5, illustrates the device 7 with the interior 30 exposed showing battery 34 and beacon 32 connections. When the top 12 is closed the plate portion 45b forces the battery in a direction towards wall portion 20 thereby providing a secure and stable battery 34 position, with simultaneous support via studs 34a and 34b to prevent unstable movement therebetween. The portability of the device 7 allows for easy transportation to the scene of a disaster where ground transportation would not be feasible.

Natural disasters often result in the breakdown of ground transportation systems. Helicopters with a marked landing area at night or day would be able to bring in response teams and supplies to evacuate injured people during the critical period before and while ground transportation is being restored.

In general for an emergency landing zone, a rescue helicopter would need four devices 7, one at each corner defining the landing site. While swirling debris raised by rotors can cause a pilot to lose sight of an intended landing point, the flashing beacons 32 of high intensity light would still be very visible. The base of the device 7 is 76.5 square in, allowing it to sit on top of snow, or any other soft type terrain surface without dropping out of sight. The device 7 may also be made waterproof. All emergency and rescue vehicles should carry at least one device 7 at all times.

Further, use of the volume space of the interior compartment 30 may include the installation of an emergency locator transmitter. This type of transmitter may be utilized in addition to the flashing strobe element 44, allowing the helicopter pilot to locate the area in poor visibility until the point that the flashing beacons 32 are seen. The device 7 may also be used for traffic control by police or fire vehicles. Tractor-trailers could use them as highway markers when broken down. The devices 7 would last at least 50 to 100 times longer than a flare, and would also eliminate the chance of ignition of combustible fuel spilled at the scene of an accident, as flares.

By contrast with conventional features, the device 7 of the present invention does not require any construction procedures in order to use the device 7. For example, in order to use conventional devices, typically a staff must be inserted into the base of each unit used. In addition, it is preferred that the device 7 be mounted to an interior wall portion 60 of an emergency rescue vehicle via pegs 60a and 60b or similar elements for easy removal or storage as diagrammatically illustrated in FIG. 6.

It is to be understood that the present invention is not limited to the embodiments described above, but encompasses any and all embodiments within the scope of the following claims.

I claim:

1. A portable emergency landing area lighting device for helicopters comprising:

a housing having a bottom surface, a top surface, a front wall surface, a rear wall surface and two side wall surfaces, said bottom surface, said top surface, said front wall surface, said rear wall surface and said two side wall surfaces defining an interior compartment;

a hinge disposed between said top surface and said rear wall surface, said top surface being hingedly movable for accessing said interior compartment;

at least one latching mechanism disposed on said front wall surface and said top surface for releasably latching said top surface to said front wall surface;

at least one handle for carrying said housing, said at least one handle being disposed on one of said two side wall surfaces;

a strobe light disposed in said top surface for providing a safety beacon;

an electrical switch disposed on said front wall surface;

an electrical coupler disposed adjacent to said electrical switch on said front wall surface;

circuit means disposed in said interior compartment for supplying a periodic transmission signal to said strobe light;

a power source positioned in said interior compartment;

wherein said electrical switch, said power source, said electrical coupler, and said strobe light are electrically connected via said circuit means for selectively applying electrical power to said strobe light;

a first apertured flange, said first apertured flange disposed on one of said two side walls and adjacent said bottom surface; and a second apertured flange, said second apertured flange disposed on the other of said two side walls and adjacent said bottom surface.

2. The portable emergency landing area lighting device according to claim 1, wherein said power source is a rechargeable battery.

3. The portable emergency landing area lighting device according to claim 2, wherein said electrical coupler connects an external power supply to said rechargeable battery in order to replenish a power level of said rechargeable battery.

4. The portable emergency landing area lighting device according to claim 3, wherein said top wall surface, said front wall surface, said second wall surface, said third wall surface, and said fourth wall surface each including a plurality of areas having a reflective medium disposed on the exterior thereof, said reflective medium being selected from the group consisting of reflective paint and reflective tape.

5. The portable emergency landing area lighting device according to claim 4, wherein said housing has a height from the bottom wall to the top wall in the range from six inches to sever inches.

6. The portable emergency landing area lighting device according to claim 5, wherein said housing and said strobe light combine for a total height up to eight inches.

\* \* \* \* \*